United States Patent [19]
Melinat

[11] 4,446,948
[45] May 8, 1984

[54] DISC BRAKE CALIPER MOUNT

[75] Inventor: Wolfgang Melinat, Dayton, Ohio

[73] Assignee: General Motors Corporation, Detroit, Mich.

[21] Appl. No.: 362,988

[22] Filed: Mar. 29, 1982

[51] Int. Cl.³ .......................................... F16D 55/224
[52] U.S. Cl. .............................. 188/73.45; 188/73.34; 188/73.35
[58] Field of Search ............... 188/73.44, 73.45, 73.43, 188/73.41, 73.39, 73.35, 73.36, 73.34, 73.33, 73.32, 73.31, 205, 206, 73.47, 369, 370

[56] References Cited

U.S. PATENT DOCUMENTS

| | | | |
|---|---|---|---|
| 4,027,750 | 6/1977 | Kawamoto et al. | 188/73.45 |
| 4,222,464 | 9/1980 | Mariya et al. | 188/73.44 |
| 4,265,341 | 5/1981 | Kuramoto | 188/73.44 |
| 4,319,670 | 3/1982 | Oka et al. | 188/73.34 |

FOREIGN PATENT DOCUMENTS

| | | | |
|---|---|---|---|
| 56-86238 | 7/1981 | Japan | 188/73.44 |
| 2041121 | 9/1980 | United Kingdom | 188/73.44 |

*Primary Examiner*—Douglas C. Butler
*Attorney, Agent, or Firm*—D. D. McGraw

[57] ABSTRACT

One-piece mounting pins are threaded into a caliper housing flange and guided in mounting bracket receiving holes having relatively large clearances between the hole diameters and the pin diameters. Rubber bushings formed as parts of protective boots, are installed at the hole entrances minimize free movement of the caliper housing subassembly on the mounting bracket. One pin may be removed and the caliper housing rotated on the other pin to provide access for removing shoe and lining assemblies.

3 Claims, 5 Drawing Figures

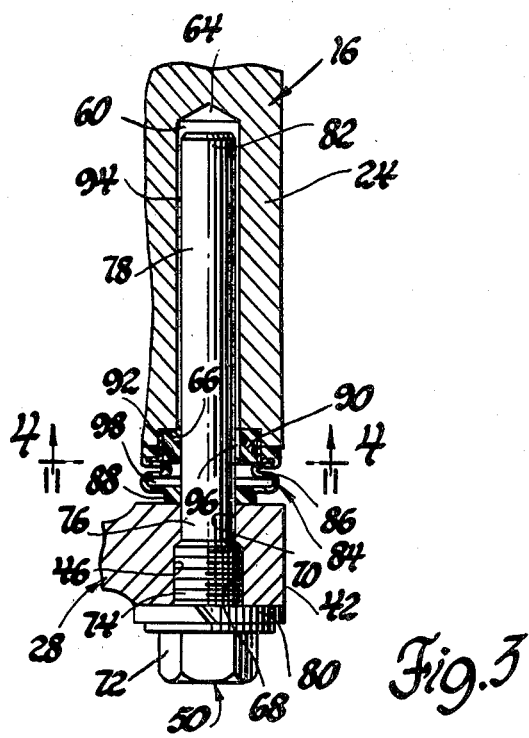
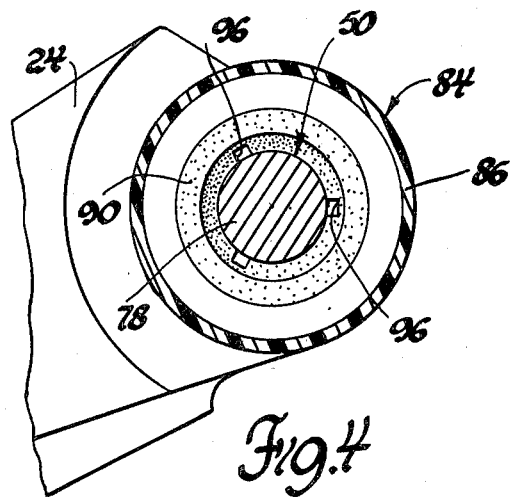
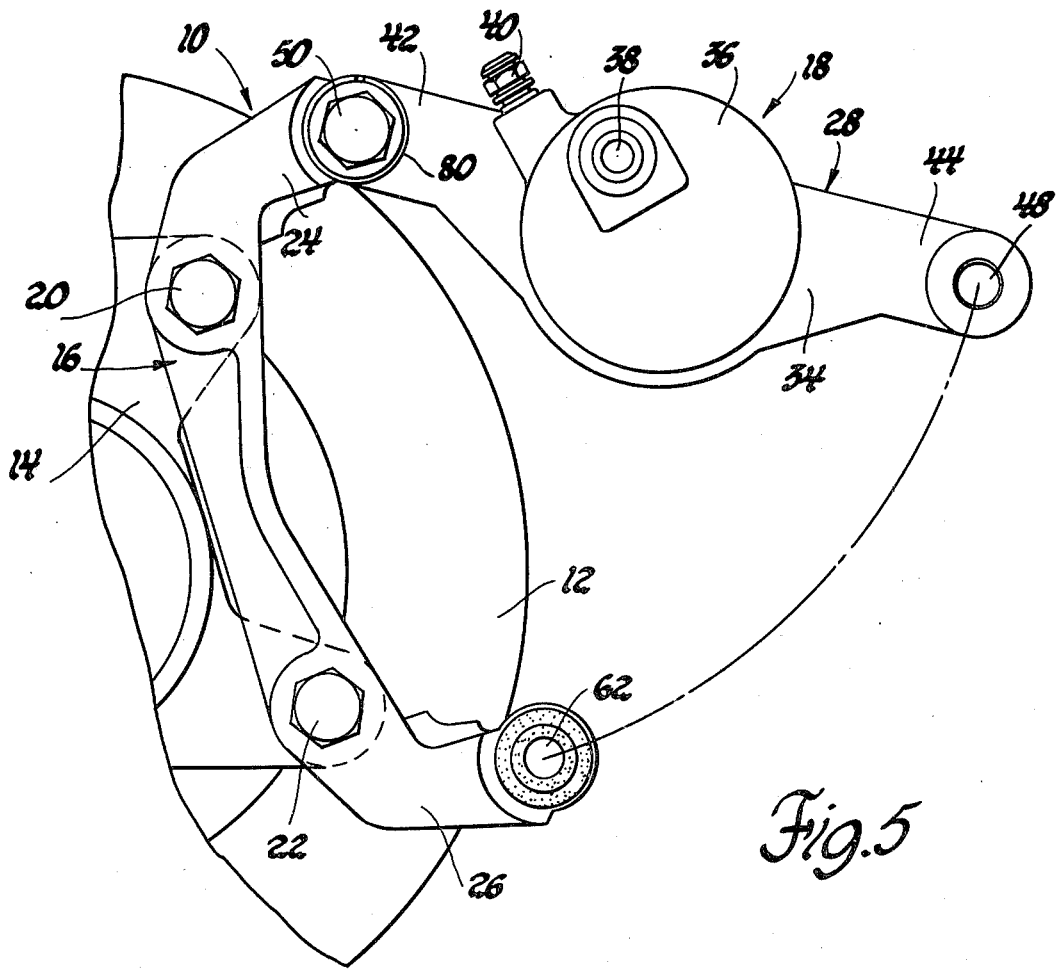

DISC BRAKE CALIPER MOUNT

The invention relates to a mounting arrangement for a disc brake caliper, and more particularly to one having one-piece mounting pins threaded into the inboard caliper housing flange and guided by pilot hole diameters to minimize installation length variations, as well as perpendicularity and parallelity deviations from a set of ideal dimensions. A mounting bracket or carrier contains receiving holes for a pair of such pins and the holes are positioned in the mounting bracket arms in such a way as to receive the pins with a minimum of misalignment between the pins and the receiving holes. Rubber bushings are installed at the entrance to the receiving holes to locate the pins on the mounting bracket. The rubber bushings are preferably part of boots which protect the pins and receiving holes. There is a relatively large clearance between the receiving hole diameters and the pin diameters to allow for temperature expansion and contraction and for mounting length differences between the inboard caliper housing flange and the mounting bracket. There is an interference fit between the rubber bushing diameters and the pin diameters so as to minimize free movement of the caliper housing subassembly on the mounting bracket. The boots are used to provide proper environmental protection for the pins. Air vents are provided as part of the rubber bushings to provide an air passage between the sealed interior of the boots, of which the rubber bushings are part, and the sealed interiors of the receiving holes. The removal and replacement of brake linings in the caliper housing are simplified. One of the mounting pins is removed and the caliper housing can then be rotated outwardly away from the disc about the axis of the other mounting pin so that the lining assemblies are accessible for removal and replacement.

IN THE DRAWINGS

FIG. 3 is a fragmentary cross-section view taken in the direction of arrows 3—3 of FIG. 1 and showing a mounting pin and its cooperation with the caliper housing and the mounting bracket in greater detail.

FIG. 4 is a cross-section view taken in the direction of arrows 4—4 of FIG. 3 and showing other details of the mounting arrangement.

FIG. 5 is a fragmentary elevation view similar to that of FIG. 1 but showing the caliper housing in a position for removal and replacement of the brake shoes, the shoes having been removed.

Figure 1:
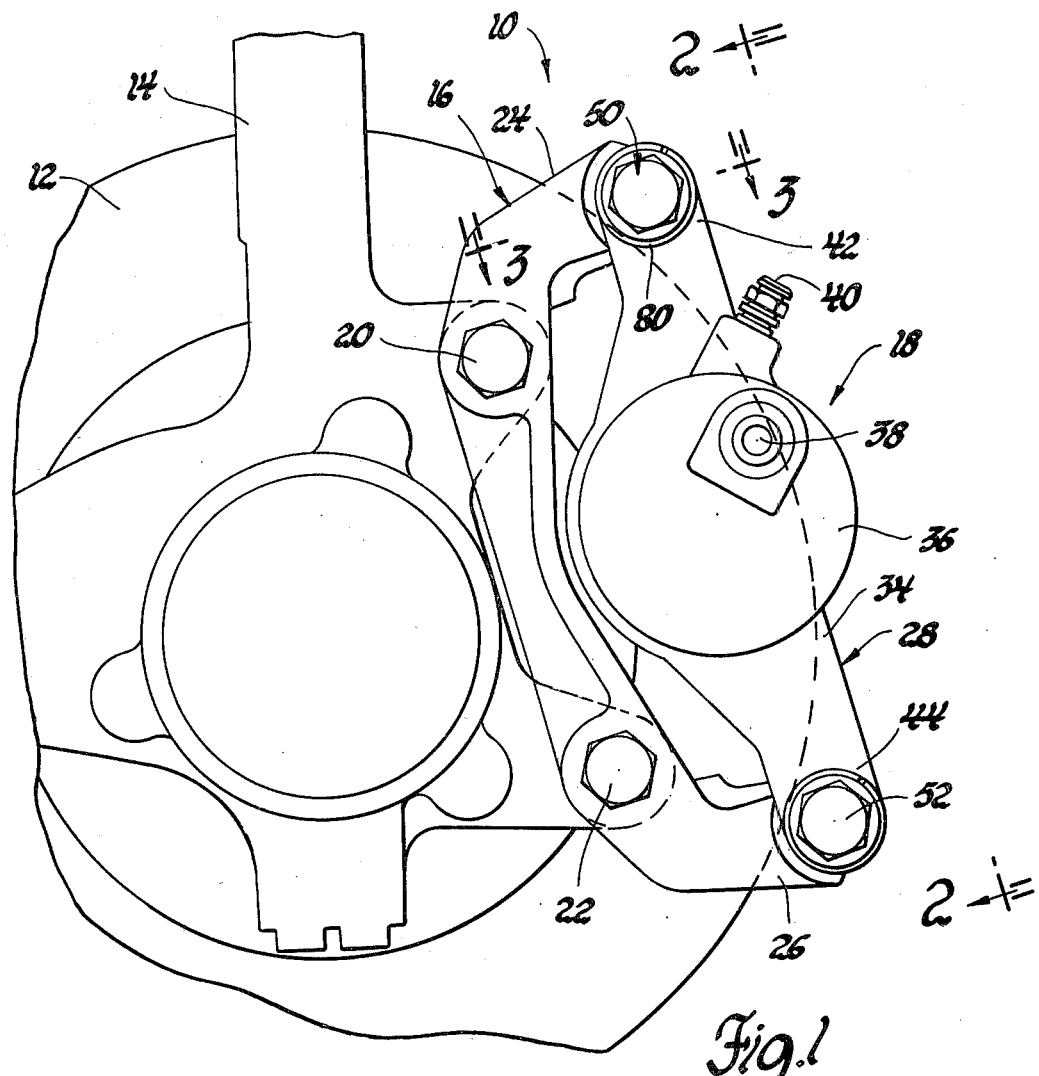
FIG. 1 is an elevation view, with parts broken away, of a disc brake assembly embodying the invention.
Figure 2:
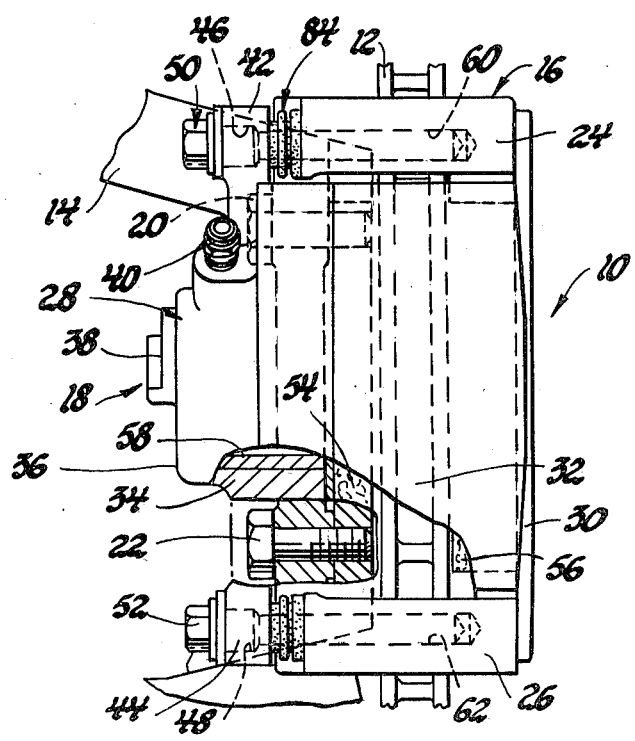
FIG. 2 is a view taken in the direction of arrows 2—2 of FIG. 1 and showing the caliper mounting arrangement from the radially outer side of the caliper.

The brake assembly 10 includes a rotatable disc 12 to be braked. The disc is suitably mounted for rotation on a portion of the vehicle, illustrated in FIG. 1 as being a steering knuckle 14 for one of the front wheels of the vehicle. Assembly 10 also includes a caliper support mounting bracket or caliper carrier 16 and a caliper assembly 18. The mounting bracket 16 is secured by bolts 20 and 22 to the steering knuckle. The bracket has arms 24 and 26 extending radially outward and peripherally across the outer periphery of the disc 12.

The caliper assembly 18 includes a caliper housing 28 having an outboard leg 30 connected by a caliper housing bridge section 32 to the caliper housing inboard leg 34. The inboard leg includes the actuating cylinder 36, which has a brake actuating pressure inlet 38 and a bleeder screw 40 suitably located for their usual purposes. The housing inboard leg 34 has oppositely extending ears 42 and 44 respectively provided with openings 46 and 48 extending therethrough which are axially parallel to the axis of rotation of the disc 12. One opening 46 is shown in cross-section detail in FIG. 3, and the other opening 48 is shown in FIG. 5. Openings 46 and 48 are arranged as will be further described to securely receive bolts or pins 50 and 52. The caliper assembly also includes an inboard brake shoe assembly 54 and an outboard brake shoe assembly 56. A hydraulic pressure actuated piston 58 in the cylinder 36 moves the inboard brake shoe assembly into friction braking engagement with one side of the disc 12, and the caliper assembly 18 slides relative to the mounting bracket or carrier 16 to move the outboard brake shoe assembly 56 into friction braking engagement with the other side of the disc 12, in a manner well known in the art.

As is better illustrated in FIGS. 2 through 5, the mounting bracket arms 24 and 26 are provided with bores 60 and 62 which respectively receive the mounting pins 50 and 52. Since the arrangement and construction of the mounting pins 50 and 52 and the cooperating portions of the caliper housing and the mounting bracket carrier are substantially identical for both carrier arms and caliper ears, only the one arrangement associated with pins 50, arm 24, and caliper ear 42 will be described in further detail. This arrangement is shown in crosssection view detail in FIGS. 3 and 4.

The mounting bracket arm 24 having bore 60 therein extends across the outer periphery of the disc 12. The bore 60 is closed at its bore end 64 and is open at the inboard bore end to provide an enlarged diameter recess 66. The opening 46 formed in caliper ear 42 has an inboard threaded portion 68 and a pilot portion 70. The pin 50 has a head portion 72, a threaded portion 74 and a pilot portion 76 on the inboard side of the pin. The remainder of the pin forms a pin slide portion 78. A lock washer 80 is fitted over the pin so as to engage the head portion 72. The pin is then inserted in the opening 46 and the bore 60. It is threaded into the caliper threaded portion 68 until the lock washer 80 fits tightly in locking relation against the side of the caliper ear 42. The pin pilot portion 76 is piloted in the caliper pilot portion 70. The pin slide portion 78 extends out of opening 46 and into bore 60. The outer end 82 of the pin 50 is axially spaced from the bore closed end 64 so that it does not abut the bore end. Suitable space is provided between the caliper ear 42 and the carrier arm 24 so that a boot 84 is mounted about a part of the pin slide portion 78 and between these two members. Boot 84 has a convoluted center body section 86 which allows for expansion and contraction of the boot during normal operation of the brake assembly. The inboard end of boot 84 is formed to provide a rubber bushing forming pin mount 88 which fits tightly about the pin slide portion 78 immediately adjacent the outboard side of the caliper ear 42 so that it seals against the caliper ear and the pin. The boot is provided with a carrier mount end 90 defining another rubber bushing. A suitable stiffening retainer 92 is molded therein. Boot end 90 abuts against the inboard end of the carrier arm 24 in an annular manner about the recess 66, and has a portion extending into the recess 66 with a sufficiently tight fit to assure retention of the boot end 90 in the recess. The boot end 90 fits about the pin slide portion 78 so as to locate the pin in the carrier arm bore 60. The diameter of the pin slide portion 78 is somewhat smaller than the diameter of bore 60 so that an annular clearance space 94 is provided between the pin slide portion 78 and the wall of bore 60. The mount end 90 of boot 84 effectively acts as a bushing which is resilient and tends to keep the pin slide portion 78 centrally disposed in bore 60. One or more vent channels 96, with three such channels being illustrated in FIG. 4, are formed in the inner periphery of the boot mount end 90 to provide for air passage between the boot interior 98 and the annular clearance space 94 of the bore 60.

The relatively large clearance defined by annular clearance space 94 allows for temperature expansion and contraction and for mounting length differences between the inboard caliper housing flange and the mounting bracket. By installing the pins in the caliper ears and piloting them therein, the installation length variations between the axes of openings 46 and 48 and bores 60 and 62 are minimized. This also minimizes problems with regard to perpendicularity of the caliper housing relative to the mounting bracket and of the mounting bracket relative to the steering knuckle and disc.

As is illustrated in FIG. 5, it is a relatively simple matter to remove and replace the brake shoe assemblies. To do so, one pin, pin 52 for example, is removed from the caliper and the caliper housing 28 is merely pivoted radially outward about the axis of the other pin 50 so that the brake shoe assemblies are readily accessible from the inner side of the caliper housing. After new shoes have been placed in position, the caliper housing is then pivoted back to the operative position and the pin 52 is reinserted and threaded tightly into place.

The embodiments of the invention in which an exclusive property or privilege is claimed are defined as follows:

1. A sliding arrangement in a disc brake comprising:
a carrier formed with a blind bore having a closed end and an open end;
a caliper having a pin including a slide portion slidably received in said bore;
said pin extending through a support portion of said caliper and having in axial series order a head portion, a pin threaded portion, a pin pilot portion and said slide portion;
said caliper support portion having a threaded portion receiving said pin threaded portion in threaded relation and a pilot portion receiving said pin pilot portion in piloted engaging relation so that said pin is in respective axially and diametrically secure relationship with said caliper support portion;
and a protective boot around a part of said pin and mounted on said carrier at said bore open end and on said pin adjacent said caliper support portion to protect said pin slide portion and said blind bore.

2. A sliding arrangement in a disc brake comprising:
a carrier formed with a blind bore having a closed end and an open end;
a caliper having a pin including a slide portion slidably received in said blind bore;
said pin extending through a support portion of said caliper and having in axial series order a head portion, a pin threaded portion, a pin pilot portion and said slide portion;
said caliper support portion having a threaded portion receiving said pin threaded portion in threaded relation and a pilot portion receiving said pin pilot portion in piloted engaging relation so that said pin is in respective axially and diametrically secure relationship with said caliper support portion;
and a protective boot around a part of said pin and mounted on said carrier at said bore open end and on said pin adjacent said caliper support portion to protect said pin slide portion and said blind bore, said boot including means permitting breathing action between said blind bore and the boot interior.

3. A sliding arrangement in a disc brake comprising:
a carrier formed with a blind bore defined by a bore wall and a closed end and having an open end;
a caliper having a pin including a slide portion slidably received in said blind bore and normally radially spaced from said bore wall;
said pin extending through a support portion of said caliper and having in axial series order a head portion, a pin threaded portion, a pin pilot portion and said slide portion;
said caliper support portion having a threaded portion receiving said pin threaded portion in threaded relation and a pilot portion receiving said pin pilot portion in piloted engaging relation so that said pin is in respective axially and diametrically secure relationship with said caliper support portion;
and a protective boot around a part of said pin and mounted on said carrier at said blind bore and on said pin adjacent said caliper support portion to protect said pin slide portion and said blind bore;
said blind bore having a diametrically enlarged open end receiving one end of said protective boot therein in sealing relation, said protective boot one end defining a resilient bushing through which said pin slide portion extends, said resilient bushing slidably guiding and locating and supporting said pin slide portion in radially spaced relation to said bore wall.

* * * * *